Nov. 1, 1955 J. T. KANEMOTO 2,722,104
IRRIGATION DAM STICKS
Filed May 17, 1954

INVENTOR,
JIMMIE T. KANEMOTO
BY
Martin E. Anderson
ATTORNEY

United States Patent Office 2,722,104
Patented Nov. 1, 1955

2,722,104
IRRIGATION DAM STICKS
Jimmie T. Kanemoto, Longmont, Colo.

Application May 17, 1954, Serial No. 430,214

1 Claim. (Cl. 61—29)

This invention relates to irrigation dam sticks and more particularly to dam sticks having a simplified hinge construction for use in adjusting the height of irrigation dams.

In certain sections of the country where rainfall cannot be depended upon for irrigation, water is taken from nearby rivers or the town canal through smaller or lateral canals. The water is then diverted from the lateral canals to the particular section which requires irrigation by placing temporary dams in the lateral canal to raise the water level and cause it to flow into the diversion ditches which lead into the fields.

The most commonly used temporary dams are those formed from a piece of canvas larger than the area bounded by the banks and the bottom of the lateral to be dammed and which has its upper edge formed into a wide hem into which a dam stick is inserted to support the dam across the lateral. The ends of the stick are fitted into depressions in the bank and the lower edge of the dam is anchored to the bottom of the lateral by means of rocks and dirt. When properly placed the dam raises the lever of the water in the lateral until the required amount flows into the ditches. Adjustments in the height of the dam are made by raising and lowering the dam stick.

In many instances where the lateral canals are only a few feet wide a dam stick which is adjustable at the center can be used quite well, thus doing away with the need for the more complicated and expensive types which are adjustable from the ditch bank. It is often possible to straddle the lateral canal while making adjustments in the height of the dam. It is important, however, that the hinge construction will permit these adjustments to be made rapidly and with a minimum of effort. Also, once the proper adjustment has been obtained, the height of the dam must remain fixed even though it is subjected to considerable force exerted by the water dammed up behind it.

Dam sticks must frequently be transported for considerable distances, and unless they are so constructed that they can be folded they are awkward to handle and therefore the principal object of this invention is to produce a foldable dam stick having a hinge construction that permits it to be readily folded and which will also latch the parts in folded position.

Since the dam sticks must frequently be shifted from one place to another and also adjusted as to height while in position it is another object of this invention to produce a latch device that will also serve as a convenient handle for carrying the dam stick in extended or folded position and which will latch it in either folded or extended position.

Among the objects of the present invention are to provide: an irrigation dam stick having an improved hinge construction; an irrigation dam stick which is ideally suited for use in supporting canvas irrigation dams across small lateral canals; an irrigation dam stick which is rapidly adjustable to the proper dam height and which will maintain the proper height even though subjected to considerable water pressure; and a dam stick of the class described which is simple and inexpensive.

Other objects will be in part apparent and in part pointed out specifically hereinafter in connection with the description of the drawing which follows; and in which, Figure 1 is a side elevation showing a canvas irrigation dam supported in place across a lateral canal by the dam stick of the present invention, parts of the dam having been broken away to better show the construction;

Figure 1:
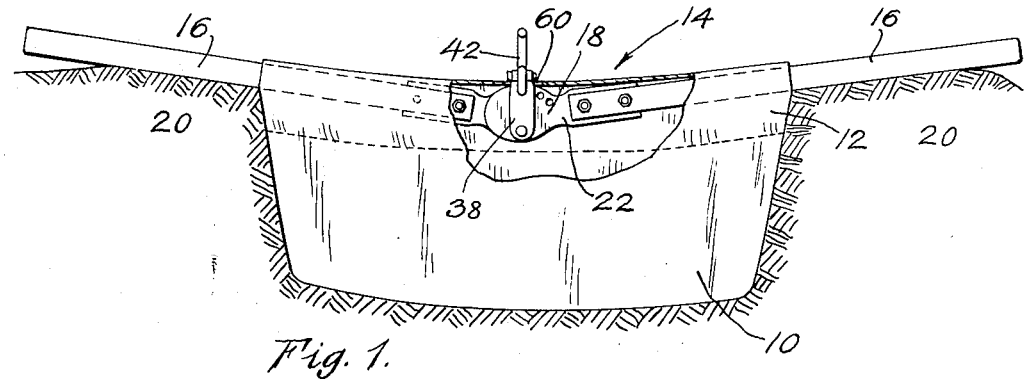

Referring now in particular to Figure 1 of the drawing, reference numeral 10 indicates a canvas irrigation dam of the conventional type having a wide hem 12 into which is inserted the dam stick indicated in a general way by numeral 14. The supporting arms 16 of the dam stick are connected together at the center by a hinge 18 which is used to adjust the height of the dam. The supporting arms support the dam between opposite banks 20 of a lateral canal. The dam is customarily held in place in the canal by piling rocks on the portion of the dam which lies along the bottom of the canal. By adjusting the height of the center of the dam stick with respect to the bottom of the canal the quantity of water which is backed up into the ditches which irrigate the fields is controlled.

Figure 4:
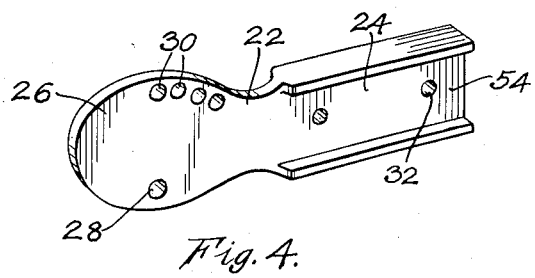
Figure 4 is a perspective view showing one of the hinge leaves.

In connection with Figure 4, the hinge leaves 22 will be seen to comprise a connecting member 24 having an I-shaped cross section and a hinge plate 26 formed integral therewith at one end. The hinge plate contains a pivot opening 28 and a plurality of adjustment openings 30 spaced circumferentially on the arc of a circle concentric with the center of the pivot opening. Bolt openings 32 are provided in the connecting member for attaching the hinge leaves to the supporting arms in a manner which will be described in connection with Figure 5 thereof.

Figure 2:
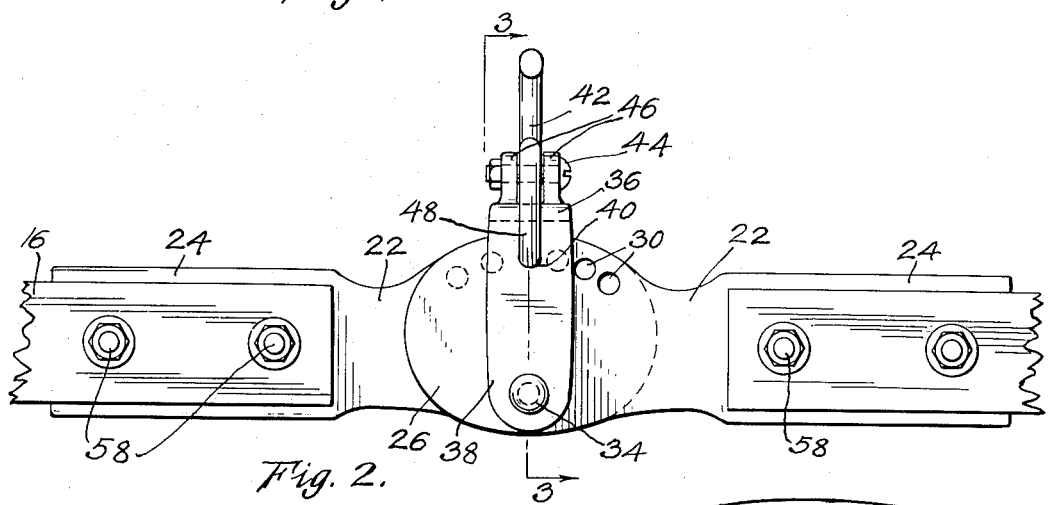
Figure 2 is an enlarged side elevation showing the hinge construction and the manner in which the hinge is joined to the supporting arms.
Figure 3:
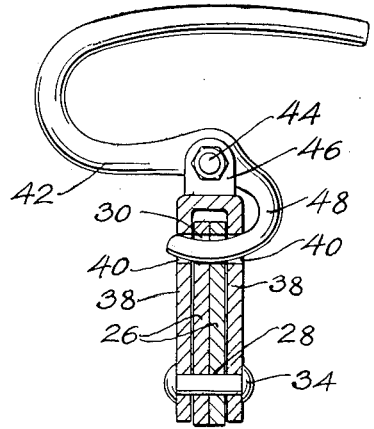
Figure 3 is a section of the hinge taken along line 3—3 of Figure 2.

With reference to Figures 2 and 3 it will be seen that two of the hinge leaves are joined together for pivotal movement by means of pivot 34 which passes through the pivot openings 28 in the hinge plates 26. When the hinge plates are pivoted relative to one another about pivot 34 one or more of the adjustment openings 30 in one of the hinge plates will be placed in register with a corresponding adjustment opening in the other hinge plate because the adjustment openings in both plates lie in circular arcs of concentric circles having the same radius. A yoke 36 having spaced leg portions 38 passing on the outside of the hinge plates is mounted for pivotal movement with respect to the hinge plates on pivot 34. Lock arm openings 40 are positioned opposite one another in each of the leg portions of the yoke the same radial distances from pivot 34 as the adjustment openings in the hinge plates. Thus pivotal movement of the yoke will bring the lock arm openings into register with the adjustment openings. A handle 42 is removably attached for pivotal movement to yoke 36 on handle pivot 44 which extends between lugs 36. A lock arm 48 is formed on one end of handle 42 in position to pass through the lock arm openings 40 in the leg portions of the yoke upon pivotal movement of the handle about handle pivot 44. The end portion of lock arm 48 is curved in an arc of a circle concentric with the center line of pivot 44 and which passes through the centers of the lock arm openings 40. The center line of pivot 44 lies in a plane substantially perpendicular to the plane of the center line of pivot 34. Thus when the hinge leaves have been pivoted into the desired angular position with one or more adjustment openings in one of the hinge plates registering with corresponding adjustment openings in the other hinge plate the yoke may be moved into position with the lock arm openings registering with the registered adjustment openings and the handle pivoted to move the lock arm through the lock arm openings and adjustment openings to lock the hinge leaves in angular position. The number of angular positions in which the hinge leaves may be locked is greatly increased by spacing the adjustment openings in each of the hinge plates so that only one pair of openings registers with one another at a given angular setting. As shown in Figure 2, this may be accomplished by using a different spacing between adjacent openings in one plate than in the other. In some instances it may not be necessary to have a great variety of angular settings and the distance between adjacent openings may be the same in both plates.

Although the hinge will permit the supporting arms to be pivoted into angular positions opening both toward the handle and away from the handle, the adjustment openings are necessary only for locking the arms in angular positions opening toward the handle as the hinge will never be locked in elevated position above the ends of the supporting members across a canal. The angular positions opening away from the handle are used for folding the dam stick for storage where it needs to be locked in that one position only. Angular position as used herein is intended to include the position in which the supporting arms are in line; that is, a 180° angular relation between the arms as shown in Figure 3.

Attention is called to the shape of the hinge portions 26 which have been shown as approximately elliptical with the pivot 34 at the lower end of the minor axis. The holes are all positioned at the same distance from the pivot. The edges of parts 26 are curved so as to gradually decrease their distance from the pivot with the result that when the arms are folded downwardly from the position shown in Figure 2 the latch arm 48 can pass through both legs 38 of yoke 36 with the result that arms 16 can not move into straight line position.

Figure 5:
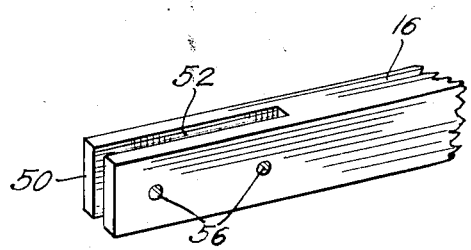
Figure 5 is a fragmentary perspective view showing the hinge end of one of the supporting arms.

In connection with Figure 5, the hinge end 50 of the supporting arm is shown provided with a slot 52 adapted to receive web 54 of connecting member 24. Bolt openings 56 are positioned to register with bolt openings 32 in the connecting member whereby the supporting arms can be connected to the hinge leaves by means of bolts 58 shown in Figure 3.

Handle pivot 44 is removable so that handle 42 can be removed while the supporting arms and hinge are inserted within the hem of the irrigation dam. An opening 60, shown in Figure 1, is provided in the upper edge of the dam so that the adjustment handle may be attached to the yoke and operated from above the dam.

Having thus described the several novel features of construction in connection with the accompanying drawing, it will be seen that the many useful objects for which the irrigation dam stick of the present invention was constructed have been achieved; and therefore, I claim:

An irrigation dam stick for use in supporting and adjusting the height of irrigation dams comprising, two elongate supporting arms, a hinge connecting the supporting arms for relative angular movement, said hinge having two hinge leaves provided with hinge plates of approximately elliptical shape connected together for relative parallel angular movement about a pivot positioned adjacent one end of the minor ellipse axis, at least one of said hinge plates being provided with a plurality of adjustment openings arranged in an arc concentric with said pivot and positioned adjacent the opposite end of the said minor axis, the other hinge plate having at least one adjustment opening positioned to register with any one of the adjustment openings in the first mentioned hinge plate upon relative pivotal movement of said plates, a yoke having spaced parallel legs straddling the hinge plates the legs being connected with the pivot, the legs of said yoke having axially aligned openings positioned to register with the adjustment openings, and a lock arm operatively connected with the yoke for pivotation, said lock arm having a curved end portion positioned to project through the openings in both legs of the yoke, the other end of said lock arm forming a handle portion.

References Cited in the file of this patent

UNITED STATES PATENTS

| | | |
|---|---|---|
| 579,277 | Lord et al. | Mar. 23, 1897 |
| 601,613 | Castle | Mar. 29, 1898 |
| 1,057,354 | McIlwain | Mar. 25, 1913 |
| 1,330,957 | Shaw | Feb. 17, 1920 |
| 2,164,846 | Thompson | July 4, 1939 |

FOREIGN PATENTS

| | | |
|---|---|---|
| 274,951 | Switzerland | July 16, 1951 |